United States Patent
Kim et al.

(10) Patent No.: US 11,144,197 B2
(45) Date of Patent: Oct. 12, 2021

(54) ELECTRONIC DEVICE PERFORMING FUNCTION ACCORDING TO GESTURE INPUT AND OPERATION METHOD THEREOF

(71) Applicant: Samsung Electronics Co., Ltd., Gyeonggi-do (KR)

(72) Inventors: Sungoh Kim, Gyeonggi-do (KR); Prushinskiy Valeriy, Gyeonggi-do (KR); Hyungsok Yeo, Gyeonggi-do (KR); Junghyeon Kim, Gyeonggi-do (KR); Hyunhee Park, Gyeonggi-do (KR); Kihuk Lee, Gyeonggi-do (KR); Jungeun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/749,114

(22) Filed: Jan. 22, 2020

(65) Prior Publication Data
US 2020/0310637 A1    Oct. 1, 2020

(30) Foreign Application Priority Data

Mar. 25, 2019   (KR) .................. 10-2019-0033832

(51) Int. Cl.
*G06F 3/0488*   (2013.01)
*G06F 40/58*   (2020.01)
(Continued)

(52) U.S. Cl.
CPC ........ *G06F 3/04883* (2013.01); *G06F 3/0482* (2013.01); *G06F 40/58* (2020.01); *G06K 9/00671* (2013.01)

(58) Field of Classification Search
None
See application file for complete search history.

(56) References Cited

U.S. PATENT DOCUMENTS

2010/0162182 A1   6/2010   Oh et al.
2012/0163668 A1   6/2012   Englund et al.
(Continued)

FOREIGN PATENT DOCUMENTS

KR   10-2015-0059466 A   6/2015
KR   10-1565768 B1   10/2015
(Continued)

OTHER PUBLICATIONS

Ismail Haritaoglu, "InfoScope: Link from Real World to Digital Information Space", 2001. (Year: 2001).*
International Search Report dated Apr. 28, 2020.

*Primary Examiner* — Nicholas R Wilson
(74) *Attorney, Agent, or Firm* — Cha & Reiter, LLC

(57) ABSTRACT

An electronic device according to certain embodiments may include: a camera module, a display including a touch panel, and a processor, memory including instructions, wherein the instructions are executable by the processor to cause the electronic device to: acquire a first image using the camera module, display the acquired first image through the display, receive a user input to the touch panel designating a partial area of the displayed first image, generate a second image by using the first image by processing image information included in the designated partial area using a function associated with a gesture included in the user input, and display the generated second image through the display.

18 Claims, 13 Drawing Sheets

(51) Int. Cl.
*G06F 3/0482* (2013.01)
*G06K 9/00* (2006.01)

(56) References Cited

U.S. PATENT DOCUMENTS

| | | |
|---|---|---|
| 2013/0050117 A1 | 2/2013 | Cho et al. |
| 2013/0088614 A1 | 4/2013 | Lee |
| 2016/0011737 A1 | 1/2016 | Kang et al. |
| 2017/0351665 A1 | 12/2017 | Kim et al. |
| 2017/0351917 A1 | 12/2017 | Son et al. |
| 2018/0203597 A1 | 7/2018 | Lee et al. |

FOREIGN PATENT DOCUMENTS

| | | |
|---|---|---|
| KR | 10-2016-0001229 A | 1/2016 |
| KR | 10-2017-0017572 A | 2/2017 |
| KR | 10-1792641 B1 | 11/2017 |
| KR | 10-2018-0093100 A | 8/2018 |

\* cited by examiner

US 11,144,197 B2

ELECTRONIC DEVICE PERFORMING FUNCTION ACCORDING TO GESTURE INPUT AND OPERATION METHOD THEREOF

CROSS-REFERENCE TO RELATED APPLICATION(S)

This application is based on and claims priority under 35 U.S.C. 119 to Korean Patent Application No. 10-2019-0033832, filed on Mar. 25, 2019, in the Korean Intellectual Property Office, the disclosure of which is herein incorporated by reference in its entirety.

BACKGROUND

1) Field

Certain embodiments relate to image processing and more particularly, to an electronic device and method that allows users to designate objects within images and perform a variety of functions on those objects using gestural touch inputs.

2) Description of Related Art

Recently, portable electronic devices have been rapidly spreading with rapid development of the electronic communication technology. These portable electronic devices may include movable communication terminals for communication and other various electronic devices, which can be freely used while moving anywhere, personal digital assistants (PDA), smart phones, tablet PCs, MP3 players, laptop personal computers, digital cameras, and wearable devices.

Electronic devices may provide a variety of complex functions. For example, the electronic devices may acquire information (e.g., image information) on an external object using an image and perform a variety of functions using the information.

The above information is presented as background information only to assist with an understanding of the disclosure. No determination has been made, and no assertion is made, as to whether any of the above might be applicable as prior art with regard to the disclosure.

SUMMARY

Electronic devices need to provide various functions instinctively. For example, more variety functions can be provided through electronic devices according to the development of the electronic devices. However, if functions desired to be performed by a user require a cumbersome procedure to access thereto, the utilization of corresponding functions may be reduced. Accordingly, there may be a need for a method for performing a function of an electronic device that enables the access to various functions in a more convenient and instinct manner.

An electronic device according to certain embodiments may include: a camera module, a display including a touch panel, and a processor, memory including instructions, wherein the instructions are executable by the processor to cause the electronic device to: acquire a first image using the camera module, display the acquired first image through the display, receive a user input to the touch panel designating a partial area of the displayed first image, generate a second image by using the first image by processing image information included in the designated partial area using a function associated with a gesture included in the user input, and display the generated second image through the display.

A method for performing a function of an electronic device according to certain embodiments may include: displaying a first image through a touch screen display, receiving a user input to the touch screen display designating a partial area of the displayed first image, generating, by a processor, a second image by using the first image by processing image information included in the designated partial area using a function associated with a gesture included in the user input; and displaying the generated second image through the touch screen display.

An electronic device according to certain embodiments can provide a function implementation which includes displaying an image and receiving consecutive touch gesture inputs on corresponding image and thus allows various functions related to the image to be easily performed at a user's convenience.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
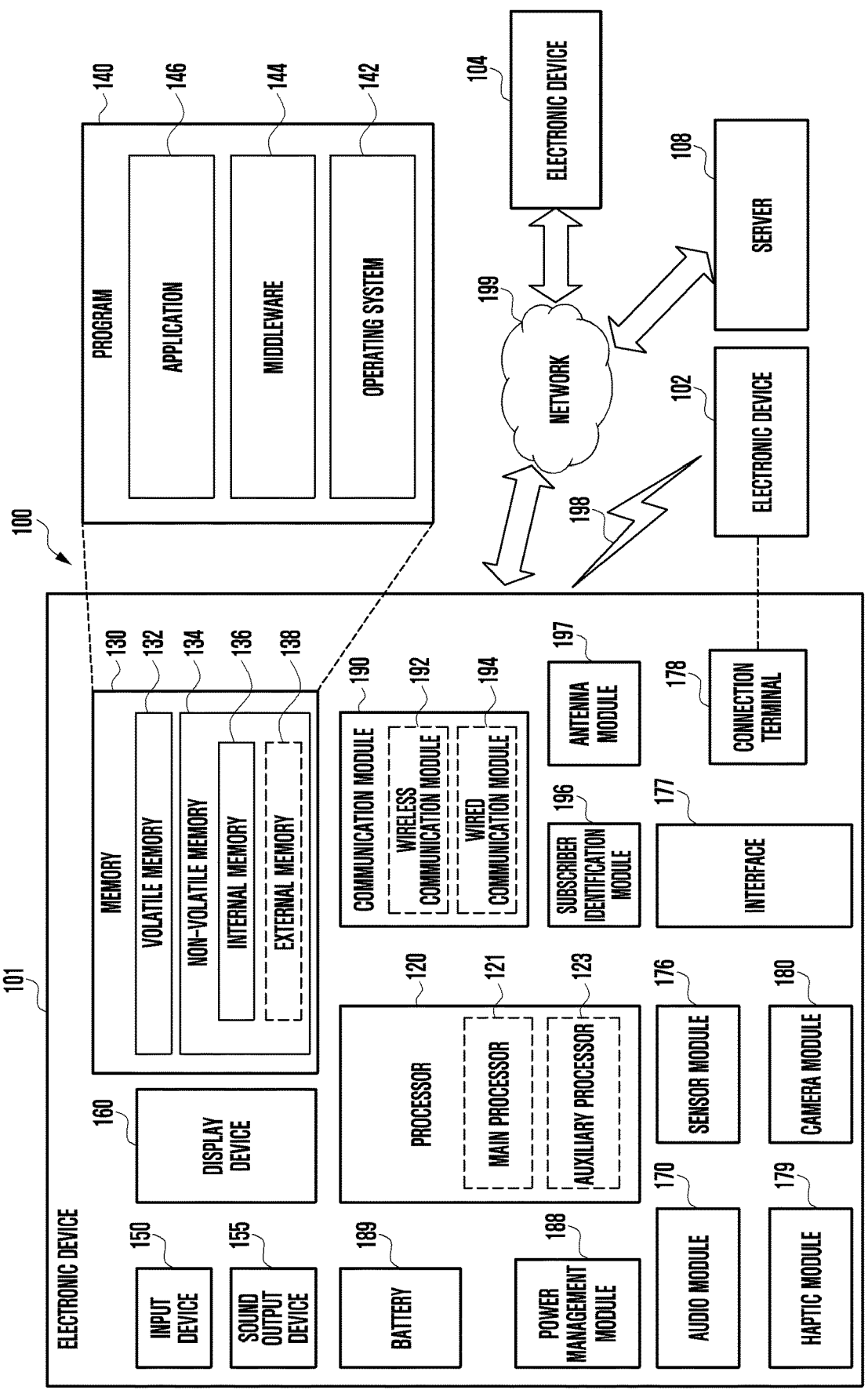
FIG. 1 is a block diagram of an electronic device 101 within a network environment 100 according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors 192a that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a radiator made of a conductor or a conductive pattern formed on a substrate (e.g., a PCB). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. In some embodiments, a part of the antenna module 197 may be formed of other components (e.g., RFIC) than the radiator.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
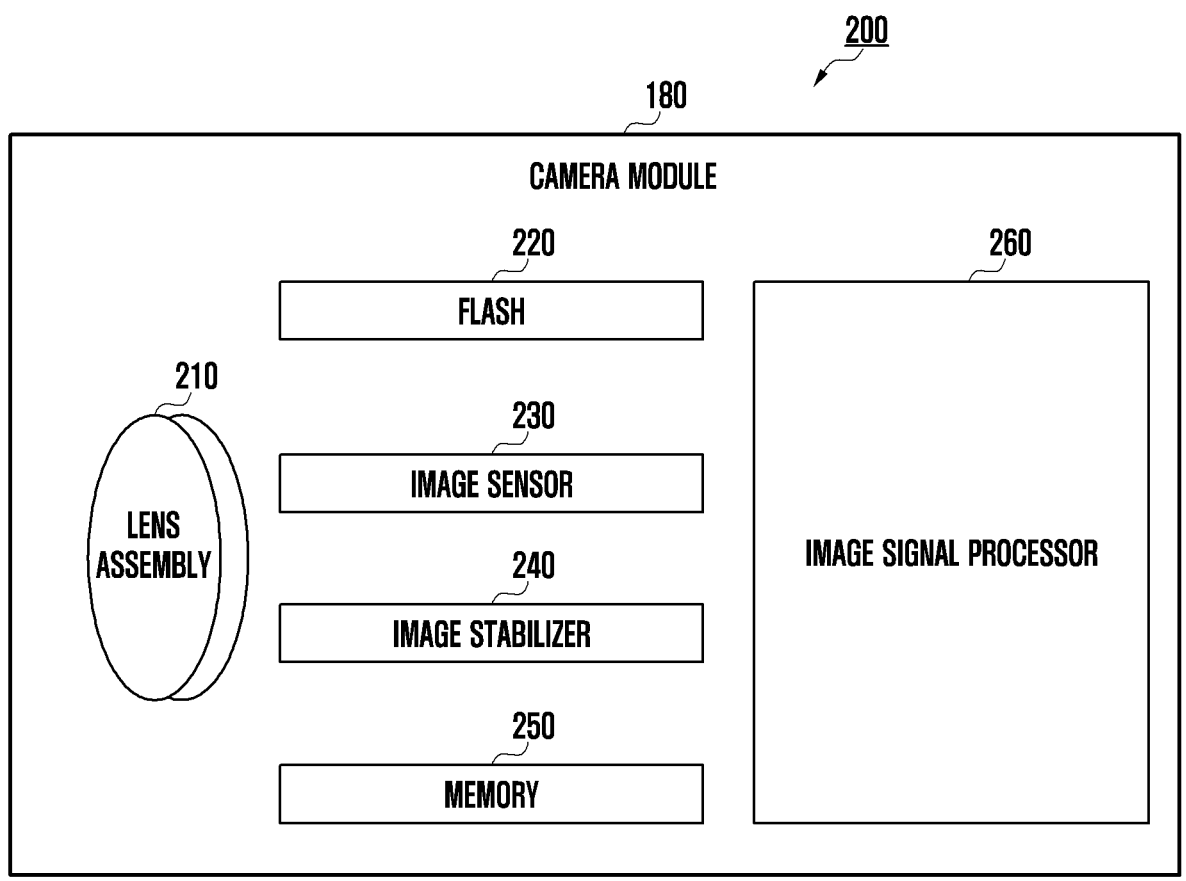
FIG. 2 is a block diagram 200 illustrating a camera module 180 according to certain embodiments.

FIG. 2 is a block diagram 200 illustrating the camera module 180 according to certain embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
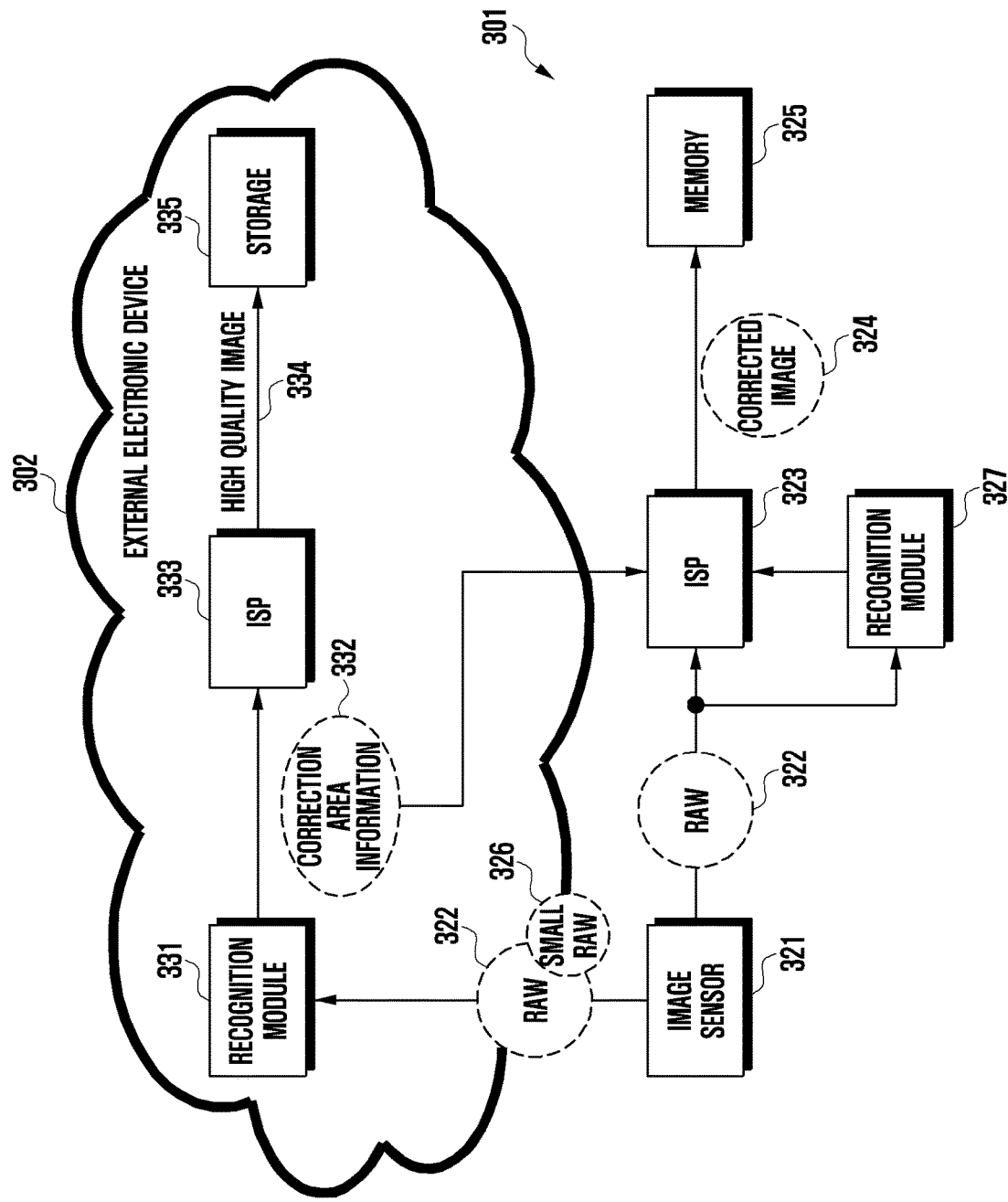
FIG. 3 is a schematic diagram describing an operation of an electronic device 301 and an external electronic device 302 according to certain embodiments.

FIG. 3 is a flowchart for describing an operation of the electronic device 301 and an external electronic device 302 according to certain embodiments.

Referring to FIG. 3, the electronic device 301 (e.g., the electronic device 101 in FIG. 1) according to certain embodiments may transmit and receive data by communicating with the external electronic device 302 (e.g., the external electronic device 102 or a server 108 in FIG. 1).

In certain embodiments, the electronic device 301 may include an image sensor 321, an image signal processor (ISP) 323, and a memory 325. The external electronic device 302 may include a recognition module 331, an ISP 333, and a storage 335. The recognition module 331 may also be a logic module and may also be implemented by a processor of the external electronic device 302. The ISP 333 may also be implemented by a processor of the external electronic device 302. For example, the processor of the external electronic device 302 may perform both recognition and image processing. Although not shown, the electronic device 301 may further include a communication module (e.g., the communication module 190 in FIG. 1) capable of transmitting and receiving data with the external electronic device 302. The external electronic device 302 may include a communication module (not shown) capable of transmitting and receiving data with the electronic device 301. According to an embodiment, the electronic device 301 may include a recognition module 327. The recognition module 327 mounted on the electronic device 301 may be configured to perform an identical function to at least one of functions of the recognition module 331. For example, the recognition module 327 may identify information of an object included in an image. For example, the recognition module 327 is a hardware configured to recognize a face in an image and thus may be used to recognize a face more simply and quickly than the external electronic device 302 (e.g., a server).

In certain embodiments, the image sensor 321 (e.g., the image sensor 230 in FIG. 2) may acquire an image for an external object and may generate a raw image 322 corresponding thereto. The raw image 322 may be implemented in various formats including a Bayer format, a format processed by a color filter array (CFA) pattern, a layered format generated by detecting all three colors in one pixel, a format generated by acquiring different parallax information by one pixel, and the like. The image sensor 321 may deliver the raw image 322 to the ISP 323 (e.g., the image signal processor 260 in FIG. 2) and/or to recognition module 327.

In certain embodiments, the image sensor 321 may generate a small raw image 326. The image sensor 321 may generate the small raw image 326 by reducing a volume of the raw image 322. For example, the image sensor 321 may generate the small raw image 326 from the raw image 322 by using various down-scale methods or down-sampling methods. The image sensor 321, for example, may perform at least one of adjusting resolution of the raw image 322, selecting at least one of a plurality of frequency bands, or selecting at least one of a plurality of bit plane levels and thus may generate the small raw image 326 having a size smaller than that of data of the raw image 322. The image sensor 321 may generate the small raw image 326, for example, by extracting a low-frequency band from the raw image 322. The image sensor 321 may also generate the small raw image 326, for example, by selecting some bit plane levels among a plurality of bit plane levels of the raw image 322. The image sensor 321 may transmit the small raw image 326 to the external electronic device 302 through a communication module. The small raw image 326 may be an image which has a volume smaller than that of the raw image 322 while including at least a part of the information of the raw image 322. In a case where the small raw image 326 is transmitted to the external electronic device 302, instead of the raw image 322, an image may be transmitted to the external electronic device 302 faster since the smaller volume thereof is transmitted thereto. According to another embodiment, a processor (e.g., the processor 120) of the electronic device 301 rather than the image sensor 321 may also generate the small raw image 326 and may transmit the generated small raw image 326 to the external electronic device 302 through a communication module.

In certain embodiments, the image sensor 321 may transmit the raw image 322 in a compressed state to the ISP 323, the external electronic device 302, or the recognition module 327. For partial processing of the raw image 322, the image sensor 321 may compress the raw image 322 and store the compressed raw image 322 in a memory inside the image sensor 321.

In certain embodiments, the recognition module 331 of the external electronic device 302 may acquire the small raw image 326 through a communication module (e.g., the communication module 190 in FIG. 1), and may obtain at least one image area (segment) from the small raw image 326 through segmentation. The recognition module 331 may recognize each image area (segment) obtained through the segmentation. For example, the recognition module 331 may perform segmentation processing on the small raw image 326 and may identify at least one image area (segment) from the small raw image 326, based on a result of the segmentation processing. The recognition module 331 may apply an object recognition algorithm or an texture recognition algorithm to an image area (segment) and thus may also recognize at least one image area (segment). The recognition module 331 of the external electronic device 302 may recognize at least one image area (segment) by using various recognition algorithms, and may recognize at least one image area (segment) by using a recognition algorithm obtained through machine learning or deep learning. For example, the recognition module 331 of the external electronic device 302 may acquire information showing that pixel coordinates (100, 101), (100, 102), (102, 102), and (102, 103) are associated with an image area (segment) of "a human tooth". In this regard, the pixel coordinates may correspond to pixel coordinates of the raw image 322. The recognition module 331 may acquire, for example, classification information that the small raw image 326 is classified as "a person is located on the street". The recognition module 331 may acquire classification information by using the recognition result, or may also acquire classification information by using color distribution and the like in the small raw image 326 without a recognition process. The recognition module 331 may generate correction area information 332 including at least one of classification information or information associated with at least one image area (segment) obtained through the above-described process. The recognition module 331 may transmit the correction area information 332 to the electronic device 301. The ISP 323 may correct the raw image 322 by using the correction area information 332, and the corrected image 324 may be generated accordingly. The corrected image 324 may have, for example, a format of YUV. The corrected image 324 may be stored in a memory 325 (e.g., the memory 130 in FIG. 1). Alternatively, the corrected image 324 may be compressed according to, for example, a JPEG method, and the compressed image may be stored in the memory 325. According to an embodiment, the correction area information may be generated by the recognition module 327 of the electronic device 301 to be transmitted to the ISP 323.

In certain embodiments, the raw image 322 provided from the image sensor 321 may be transmitted to the external electronic device 302 separately from the small raw image 326. The external electronic device 302 may generate another correction area information by using the raw image 322. The external electronic device 302 (e.g., the ISP 333 of the external electronic device 302) may use the raw image 322 having a size larger than the small raw image 326 to generate correction area information different from the correction area information of a case in which the small raw image 326 is used, and may name the generated correction area information as expanded correction area information. Since the raw image 322 may include much more information than the small raw image 326, the external electronic device 302 may generate more detailed correction area information. In certain embodiments, the external electronic device 302 (e.g., the ISP 333 of the external electronic device 302) may generate correction area information directly expanded from the raw image 322. Alternatively, the external electronic device 302 (e.g., the ISP 333 of the external electronic device 302) may also generate correction area information previously generated by using the small raw image 326 and correction area information expanded by using the raw image 322.

In certain embodiments, since the raw image 322 has a volume greater than the small raw image 326, the small raw image 326 is first transmitted to the external electronic device 302, and then the raw image 322 may be transmitted to the external electronic device 302. For example, the raw image 322 may be transmitted to the external electronic device 302 while the ISP 323 performs correction on the raw image 322. The raw image 322 may be uploaded without change from the image generated by the image sensor 321, to the external electronic device 302 or may be uploaded as a preprocessed image on which lens distortion compensation or noise removal is performed. The above-described preprocessing may be performed by the external electronic device 302. The external electronic device 302 may perform demosaic processing or preprocessing for modification of an image format or increase of an image recognition rate. The ISP 333 of the external electronic device 302 may correct the received raw image 322. The external electronic device 302 may also correct the raw image 322 by using the previously generated correction area information 332 or may also correct the raw image 322 by using the expanded correction area information. The raw image 322 may have a resolution higher than the small raw image 326. Accordingly, the ISP 333 of the external electronic device 302 may acquire more detailed expanded correction area information from a high-quality image. The ISP 333 may also generate expanded correction area information by using the previously generated correction area information and the raw image 322 together. The ISP 333 may correct the raw image 322 by using the expanded correction area information to acquire a high-quality image 334. The high-quality image 334 may be stored in the storage 335 of the external electronic device 302 or may be downloaded to the electronic device 301.

Figure 4:
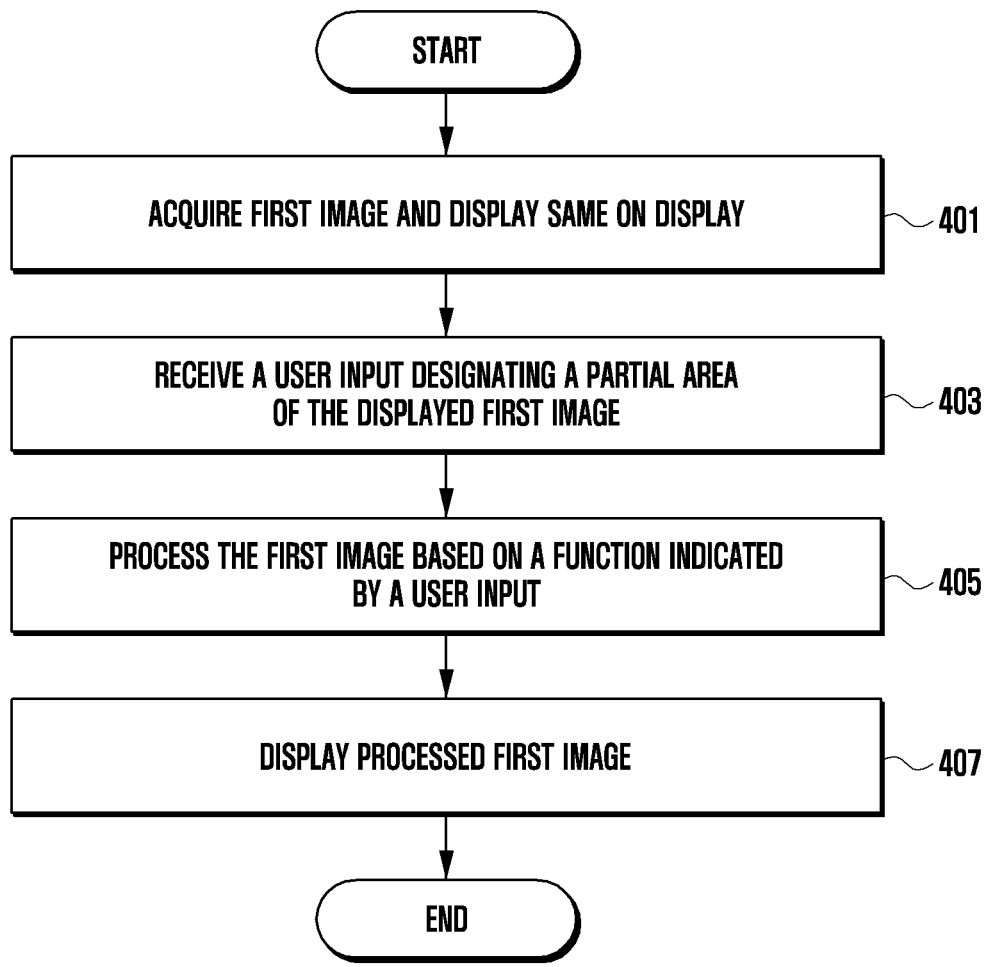
FIG. 4 is a flowchart showing an image processing method according to certain embodiments.

FIG. 4 is a flowchart showing a method for processing an image according to certain embodiments.

The electronic device 301 (e.g., the electronic device 101 in FIG. 1 or the processor 120 of the electronic device 101 in FIG. 1) according to certain embodiments may acquire at least one first image corresponding to an external object.

For example, in operation 401, the electronic device 301 (e.g., the processor of the electronic device 301) may acquire a first image by using a camera module (e.g., the camera module 180 of FIG. 1) and display the acquired first image through a display (e.g., the display device 160 of FIG. 1). According to an embodiment, the first image may include a preview image. For example, the electronic device 301 may acquire a preview image corresponding to an external object in real time through a camera module and display the same on a display. According to another embodiment, the first image may include an image acquired by using a camera module at a specific point in time. According to another example embodiment, the first image may include an image stored beforehand in a memory (e.g., the memory 130 of FIG. 1) or an image received from the outside through a communication module (e.g., the communication module 190 of FIG. 1).

The electronic device 301 according to certain embodiments may receive a user input through a touch panel in operation 403. For example, a display (e.g., the display device 160 of FIG. 1) of the electronic device 301 may include a touch panel that can recognize a user's touch input (e.g., a touch screen). For example, the touch panel may acquire information on a user's touch input or touch hovering input (for example, information on a touch position, an area, a pressure, or a touch time) and provide the information to a processor.

According to certain embodiments, the electronic device 301 may receive a user input indicating a partial area of a first image output through a display (e.g., indicate a particular area, region or point within the first image). For example, the electronic device 301 may acquire at least one of information for designating a partial area of a first image or information on a function to be processed on the partial area of the first image, based on a user input on the partial area of the first image.

For example, the electronic device 301 may identify the a partial area of a first image and the type of a function to be processed on the partial area, based on a touch type (e.g., at least one of a touch position, a touch area, or a touch pressure) having received a user input and a type of a gesture of the user input.

According to an embodiment, a partial area of the first image may be designated as a touch gesture input drawing a closed loop on a display on which the first image is displayed is received. For example, in a case where a touch gesture input in the form of a closed loop is detected on a display on which a first image is displayed, the electronic device 301 may designate an inner area of the closed loop as a partial area of the first image. According to another embodiment, the electronic device 301 may designate the partial area, based on consecutive gesture input directions even if a user input is not received in the form of a closed loop. According to certain embodiments, the electronic device 301 may identify the function type to be processed on the designated partial area, based on a type of a gesture of a user input that designates the partial area of the first image, or may also identify the function type to be processed on the designated partial area, based on an additional gesture input following the user input that designates the partial area of the first image.

According to certain embodiments, in operation 405, the electronic device 301 may process the first image using a function indicated by a user input generated in association with the first image.

For example, the electronic device 301 may process a first image by performing a designated function, based on image information of a partial area designated by a user input and a type of a gesture of the user input.

For example, the electronic device 301 may receive a touch gesture input following a user input in operation 403.

For example, the electronic device 301 may receive a first user input for designating a partial area of an image (e.g., a first user input in the form of a closed loop) and a second user input subsequent to the first user input. The second user input may be a touch gesture input received within a designated time (e.g., 1 second) after the first user input is received. For example, the electronic device 301 may determine a function to be performed on a first image, based on a type of a gesture of a first user input or based on a type of a gesture of a second user input subsequent to the first user input. For another example, the electronic device 301 may determine a function to be performed on a first image, based on a type of a gesture of a first user input and a type of a gesture of a second user input. For example, the electronic device 301 may preconfigure a plurality of image processing functions corresponding to a plurality of gesture types and perform a corresponding function, based on a received user input.

According to certain embodiments, processing a first image in operation 405 may be performed based on image information of a partial area of a first image designated in operation 403. For example, the electronic device 301 may recognize an image area (segment) of a partial area designated by a user input and identify an object type corresponding to the partial area. For example, the electronic device 301 may recognize an object type (e.g., a face, a text, or a material) on an image through a processor (e.g., the recognition module 327 in FIG. 3). For another example, the electronic device 301 may transmit image information related to a first image to an external electronic device (e.g., the external electronic device 302 in FIG. 3) (e.g., a server) by using a communication module and receive information obtained through the recognition module 331 of the external electronic device, and thus also identify the object type in the partial area of the first image.

According to certain embodiments, the electronic device 301 may determine a function to be applied to a first image, based on an object type corresponding to a partial area of a first image. For example, the electronic device 301 may automatically recognize an object type corresponding to a partial area of a first image designated by a user input and perform a function corresponding to a type of a gesture following the user input, based the object type.

For example, the electronic device 301 may output, on a display, guide gesture shapes related to a function applicable to the partial area, based on an object type corresponding to the designated partial area.

For example, the electronic device 301 may determine whether a function corresponding to a type of a gesture following the user input is suitable to be applied to the partial area, based on an object type corresponding to the partial area. According to an embodiment, the electronic device 301 may determine that the object type corresponding to the partial area is a face. In this case, even if the type of a gesture of the user input corresponds to text translation, the electronic device 301 may output a message notifying that an incorrect user input has been received, instead of performing a translation function on the partial area, or output a screen allowing selection of whether or not to perform a translation function.

According to certain embodiments, a function performed on the partial area of the first image, based on a type of a gesture following the user input, may include at least one of image correction, text translation, or object information (e.g., object type information, location information, road information, and the like) output.

For example, the electronic device 301 may perform a function corresponding to a type of a gesture following a user input on a partial area of a first image selected by the user input to process the first image. In this case, the function performed on the partial area may be determined based on a type of a gesture of a user input. For example, in a case where a type of a gesture of a user input is a house shape, the electronic device 301 may identify building information of an object included in the partial area to which the user input has been received, and perform a function related to the building information.

According to certain embodiments, the electronic device 301 may use an external electronic device (e.g., the external electronic device 302 in FIG. 3) in order to perform a function corresponding to a type of a gesture following a user input on a partial area of a first image. For example, the electronic device 301 may transmit, to an external electronic device, image information related to a first image and information on a function to be performed, and receive, from the external electronic device, correction information of the first image on which the function is performed. For example, the electronic device 301 may generate a second image that is a product obtained by processing the first image by using correction information of the first image received from the external electronic device.

In operation 407, the electronic device 301 according to certain embodiments may output, through a display, a first image processed based on a user input. For example, the electronic device 301 may generate a second image that is a product obtained by performing a predetermined function corresponding to a user input on a partial area of a first image. The electronic device 301 may store the generated second image in a memory (e.g., the memory 130 in FIG. 1). According to certain embodiments, the second image may include an image generated by performing, on a partial area of a first image, at least one image correction function of white balance adjustment, color adjustment, noise reduction, sharpen, detail enhancement, or size adjustment. According to another embodiment, a second image may include an image which is modified to include a translated text instead of a text in a partial area of a first image by translating the text included in the partial area of a first image into a pre-configured language. According to another embodiment, the second image may include an image in which information of a building included in a partial area of a first image is displayed on the first image.

The electronic device 301 according to certain embodiments may control to drive a specific application, based on a type of a gesture following a user input. For example, in a case where the type of a gesture corresponds to a function that requests location information of an object (for example, a building), the electronic device 301 may perform a specific application that can output information of an object included in a partial area of the first image and provide location information of the object to a user by using the application. For example, the location information of the object may include information on a route from a location of the electronic device 301 to a location of the object or information on a route from a location of the object to a specific place.

Figure 5:
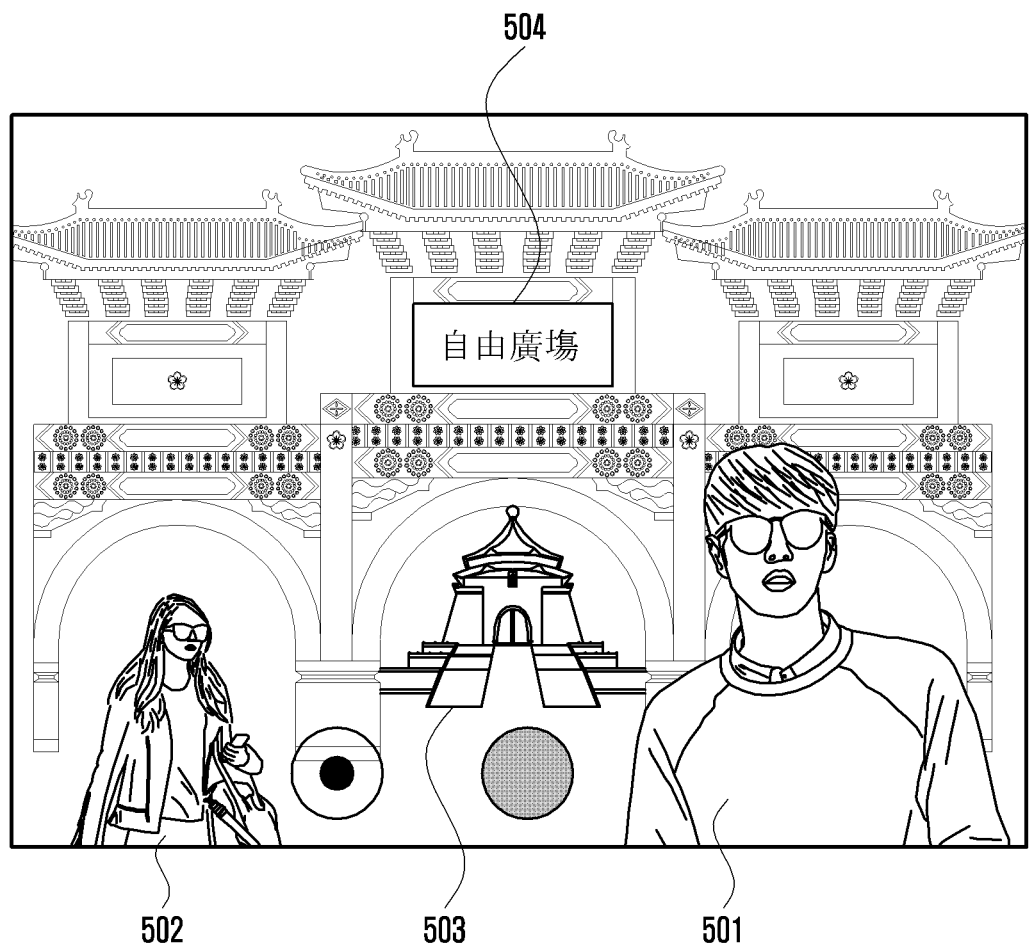
FIG. 5 illustrates a display screen of a first image according to certain embodiments.

FIG. 5 illustrates a display screen of a first image according to certain embodiments.

The electronic device 301 according to certain embodiments may acquire a first image corresponding to an external object by using a camera module and output the first image acquired through a display.

Referring to FIG. 5, a first image may include partial areas 501, 502, 503, and 504, corresponding to at least one object. For example, as illustrated in FIG. 5, the first image may include at least one of partial areas 501 and 502 corresponding to people (e.g., a "person" object), a partial area 503 corresponding to a specific building object, or a partial area 504 corresponding to a text.

For example, the first image may include a preview image which acquires and displays an image corresponding to an external object in real time through a camera module. According to an embodiment, the preview image displayed through the display may be a copy image (e.g., a low-quality image) corresponding to an image (e.g., an original image) acquired through the camera module.

According to certain embodiments, the electronic device 301 may recognize at least one image area (segment) from a first image (e.g., a preview image) and acquire information associated with the recognized image area (e.g., a segment). For example, the electronic device 301 may acquire classification information on at least one image area (e.g., a segment) of a first image. For example, the electronic device 301 may acquire classification information on an image through a processor (e.g., the recognition module 327 in FIG. 3) or the external electronic device 302 (e.g., the recognition module 331 of the external electronic device 302 in FIG. 3). For example, classification information may include at least one of object information (e.g., sky, balloons, grass), date information (e.g., 2019. Feb. 20. 13:00), place information (e.g., Seoul, South Korea), seasonal information (e.g., summer), weather information (e.g., sunny), or exposure related information (e.g., exposure time variables, ISO variables).

Figure 6A:
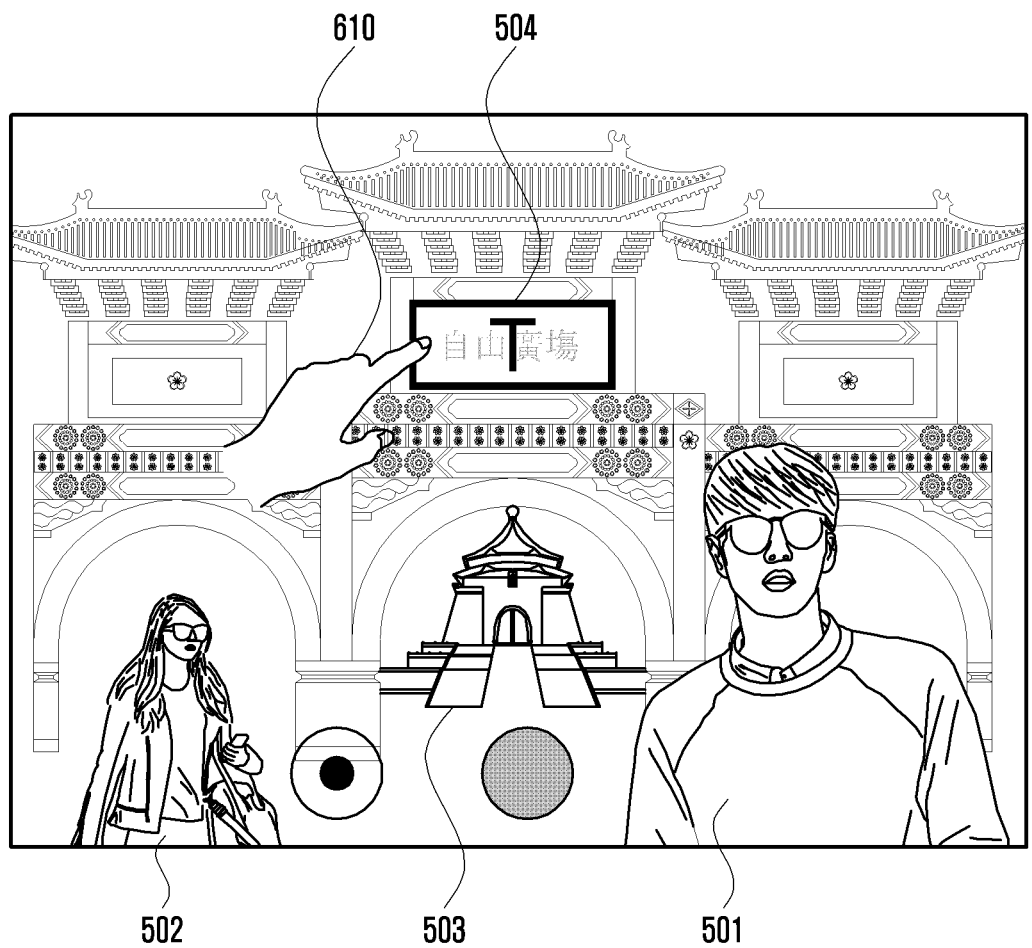
FIG. 6A illustrates a method for performing a function of the electronic device 301 according to certain embodiments.
Figure 6B:
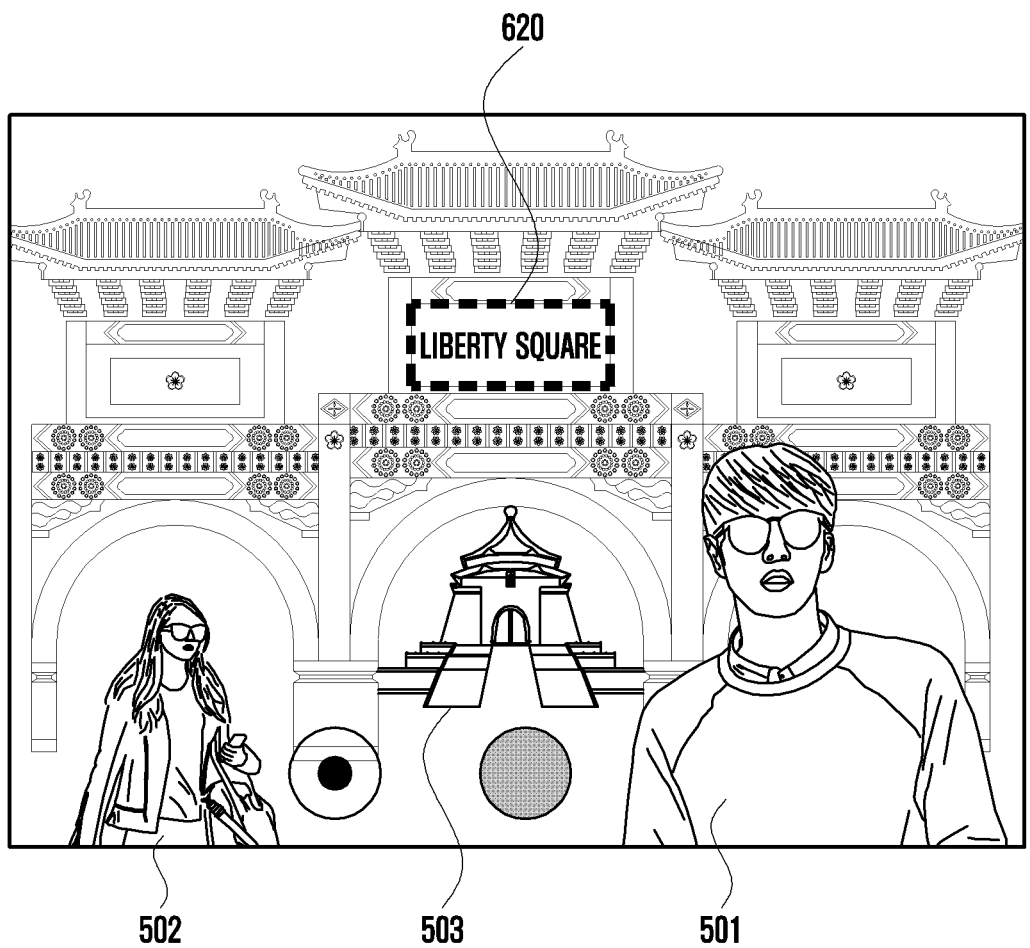
FIG. 6B illustrates a method for performing a function of the electronic device 301 according to certain embodiments.

FIG. 6A illustrates a method for performing a function of the electronic device 301 according to certain embodiments, and FIG. 6B illustrates a method for performing a function of the electronic device 301 according to certain embodiments.

FIG. 6A illustrates an operation of receiving a touch gesture input 610 by the electronic device 301 according to certain embodiments.

Referring to FIG. 6A, the electronic device 301 according to certain embodiments may acquire a first image (e.g., a preview image) and display the first image through a display (as described with reference to FIG. 5). The first image may include areas 501, 502, 503, and 504 corresponding to one or more objects (as described earlier as persons, objects and text).

According to certain embodiments, the electronic device 301 may receive a user input 610 designating a partial area on the first image displayed through a display. For example, the electronic device 301 may receive a touch gesture 504 input in the form of a "closed loop" for designating a partial area 504 corresponding to a specific text included in the first image. For example, a user may input a touch gesture tracing out a rectangular closed loop followed by an input of a "T" shaped touch gesture 610 subsequent to the touch gesture defining the closed loop onto the partial area. For example, the consecutive touch gestures 610 in the form of a rectangular closed loop and a "T" shape may be interpreted as requesting performance of image processing on the partial area 504 to which the touch gestures 610 are input.

FIG. 6B illustrates a screen displaying a result of processing a first image by the electronic device 301 according to certain embodiments.

According to certain embodiments, the electronic device 301 may perform a corresponding function, based on a user input (e.g., input of the touch gesture 610). For example, the electronic device 301 may perform a translation function on the partial area 504 designated by the touch gesture 610. For example, the electronic device 301 may generate an image area (e.g., a segment) 620 in which a text corresponding to the designated partial area 504 is translated into a pre-configured language (e.g., English), and generate a second image through a combination with the first image.

Figure 7A:
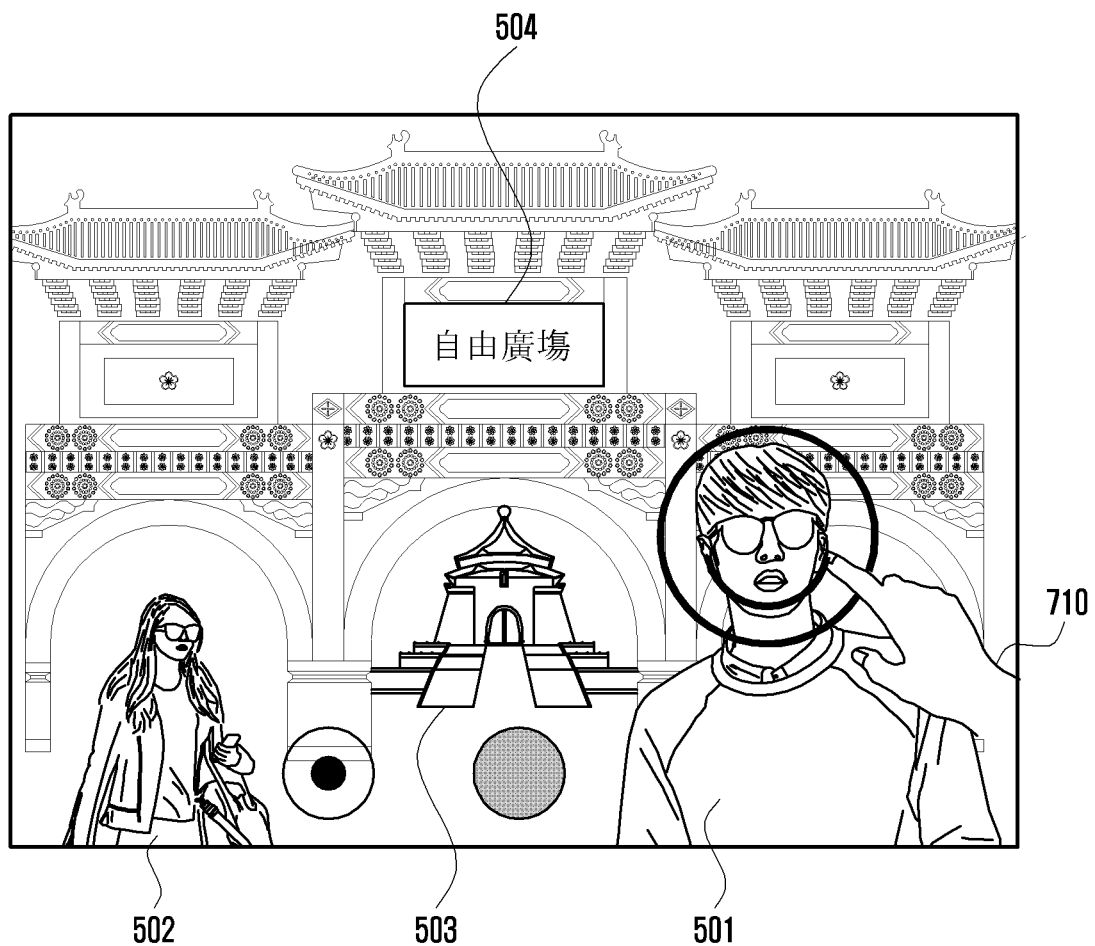
FIG. 7A illustrates a method for performing a function of the electronic device 301 according to certain embodiments.

Referring to FIG. 7A, the electronic device 301 according to certain embodiments may receive a user input (e.g., a touch gesture input) through a touch panel of a display on which a first image including areas 501, 502, 503, and 504 corresponding to one or more objects is displayed. For example, a user input may be performed on one of the areas 501 and 502 corresponding to one of the person objects included in the first image. According to an embodiment, a user may input a touch gesture 710 in the form of a circular closed loop shape onto the partial area 501 on a first image in order to designate the partial area 501 corresponding to a specific person included in the first image. For example, a user may input a touch gesture 710 by tracing a circle and then subsequently drawing a line within in the form of a smile. For example, the inputs of the consecutive touch gestures 710 in the form of a circular closed loop, and a smile shape may be recognized as an input requesting performance of an image correction function on the partial area 501 indicated by the touch gesture 710.

For example, the image correction function corresponding to the inputs of the consecutive touch gestures 710 in the form of a circular closed loop and a smile shape may include at least one of white balance adjustment, color adjustment, noise reduction, sharpen, detail enhancement, or size adjustment. For example, the function corresponding to the input of the consecutive touch gestures 710 in the form of a circular closed loop and the smile shape may include a function of generating an emoticon, based on a face of a person object in the partial area 501 to which the touch gestures 710 are input.

According to certain embodiments, the form of a touch gesture 710 recognized by the electronic device 301 is not limited to the consecutive touch gestures in the form of a circular closed loop and a smile shape, and a type of a touch gesture or a function corresponding thereto may be changed and applied at user's convenience.

Although not illustrated, the electronic device 301 according to certain embodiments may display, on a partial area of a screen on which a first image has been output, guide gesture shapes relating to a touch gesture type recognizable by the electronic device 301. For example, a user may input a specific touch gesture type to a display on which the first image is displayed, with reference to the guide gesture shapes.

Figure 7B:
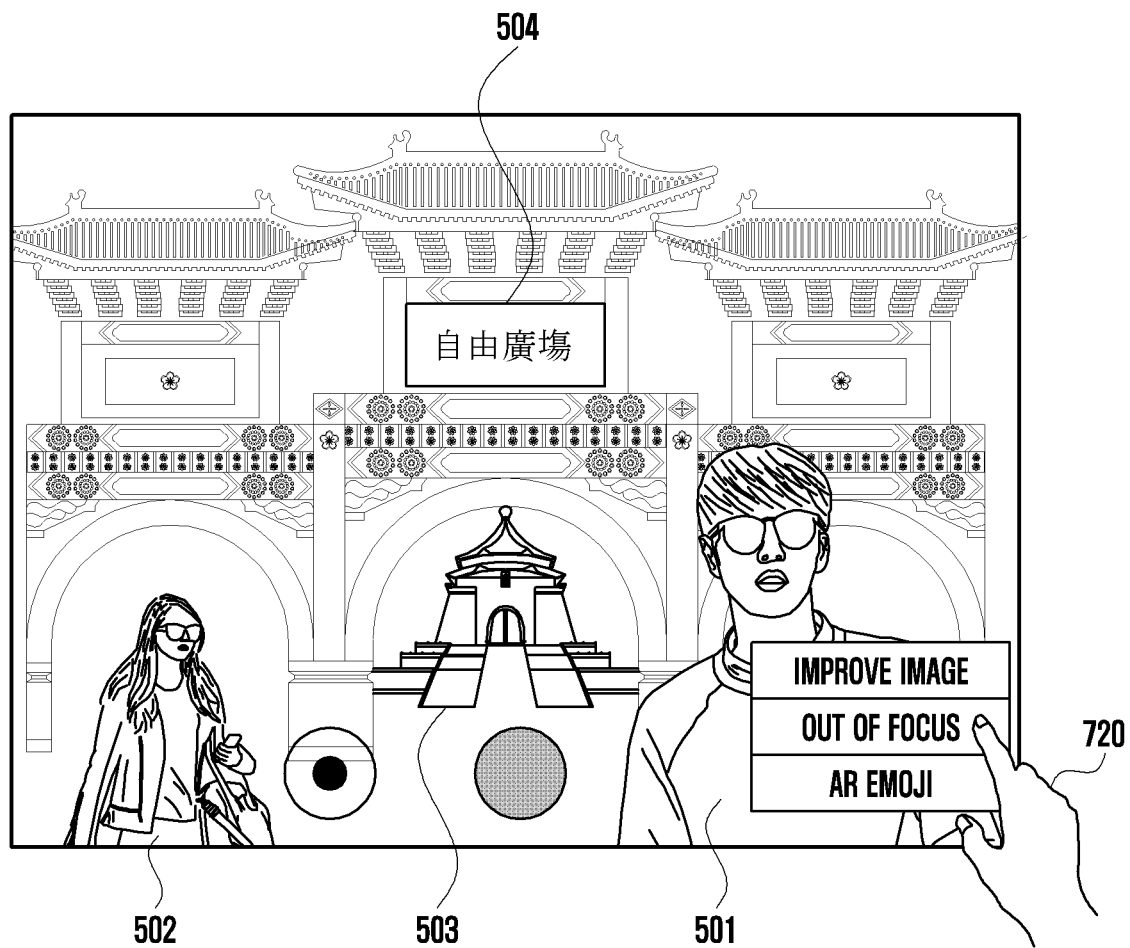
FIG. 7B illustrates a method for performing a function of the electronic device 301 according to certain embodiments.

Referring to FIG. 7B, the electronic device 301 according to certain embodiments may output a menu bar corresponding to the form of the input touch gesture 710, based on the inputs of the consecutive touch gestures 710. For example, in response to inputs of the consecutive touch gestures 710 in the form of a circular closed loop and a smile shape, the electronic device 301 may display, on a partial area of a screen on which a first image is displayed, a menu bar including at least one item of an improve image function, an out of focus function, and an augmented reality (AR) emoji generating (e.g., generating an AR emoticon, based on a person object) function.

For example, after the touch gesture 710 in FIG. 7A is input, the electronic device 301 may output a menu bar corresponding to the touch gesture 710 and receive a user input 720 for selecting one of items displayed on the menu bar. For example, the electronic device 301 may receive a user touch input 720 for selecting an out of focus function among a plurality of items on the menu bar.

According to certain embodiments, the output operation of the menu bar illustrated in FIG. 7B may be omitted according to the type of an input touch gesture 710 form or a configuration designated by a user. For example, in a case in which there is one function corresponding to the form of the touch gesture 710, the electronic device 301 may perform a function corresponding to the touch gesture 710 without outputting a separate menu bar or receiving a user input 720 and process a partial area of a first image. For example, the electronic device 301 may receive a consecutive touch gestures in a form of a circular closed loop and a multi-touch for enlarging and displaying an area of the circular closed loop. For example, the electronic device 301 may generate a second image to which an image effect obtained by partially enlarging and displaying a partial area (e.g., a face area) designated by the circular closed loop-touch gesture is applied, without displaying a separate menu bar, based on the consecutive touch gestures in the form of a circular closed loop and a multi-touch for enlarging and displaying.

Figure 7C:
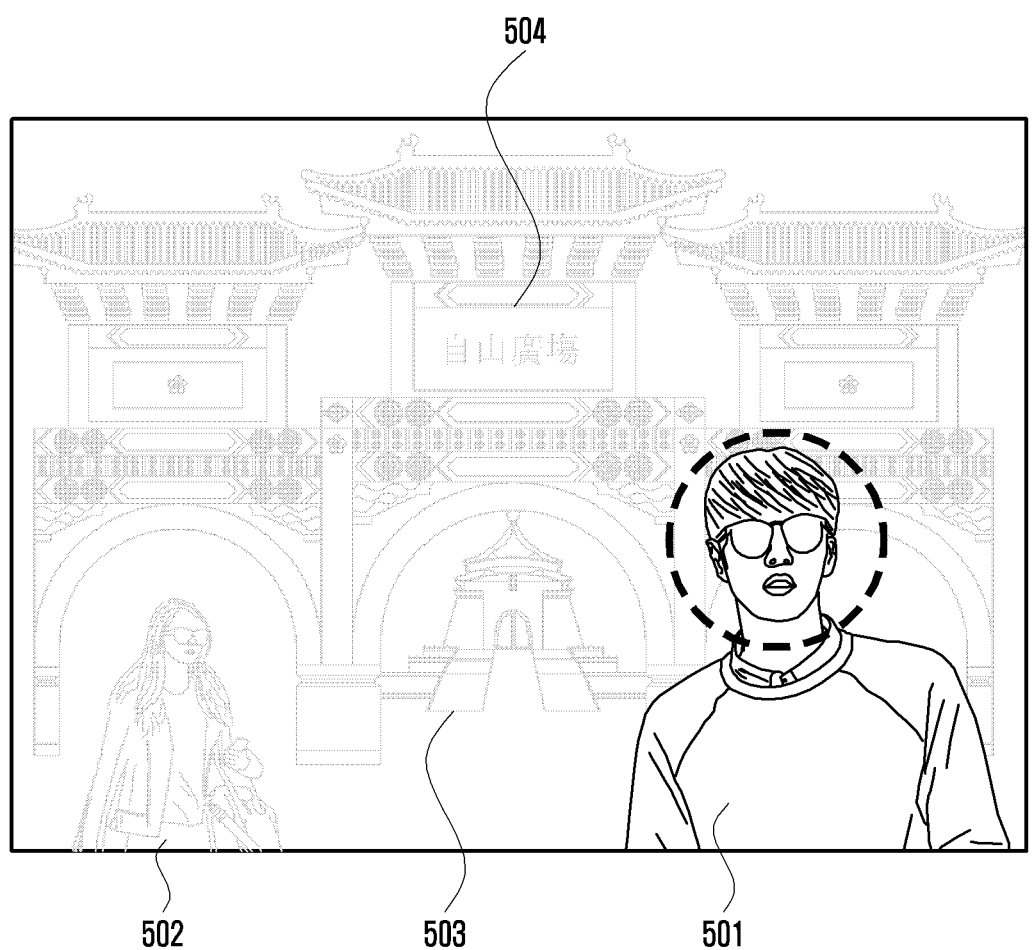
FIG. 7C illustrates a method for performing a function of the electronic device 301 according to certain embodiments.

Referring to FIG. 7C, the electronic device 301 may perform a corresponding function, based on a user input (e.g., an input of the touch gesture 710 and the user touch input 720 on a menu bar). For example, in a case where a user inputs the user touch input 720 for selecting an out of focus function among a plurality of items on a menu bar in FIG. 7B, the electronic device 301 may perform the out of focus function on a partial area 501 designated based on the touch gesture 710. For example, the electronic device 301 may generate a second image from a first image by applying an effect in which the designated partial area 501 is in focus and the remaining area is out of focus. For example, a function on a partial area of the first image may be performed directly by the electronic device 301 or may be performed through an operation with the external electronic device 302 illustrated in FIG. 3.

Figure 8A:
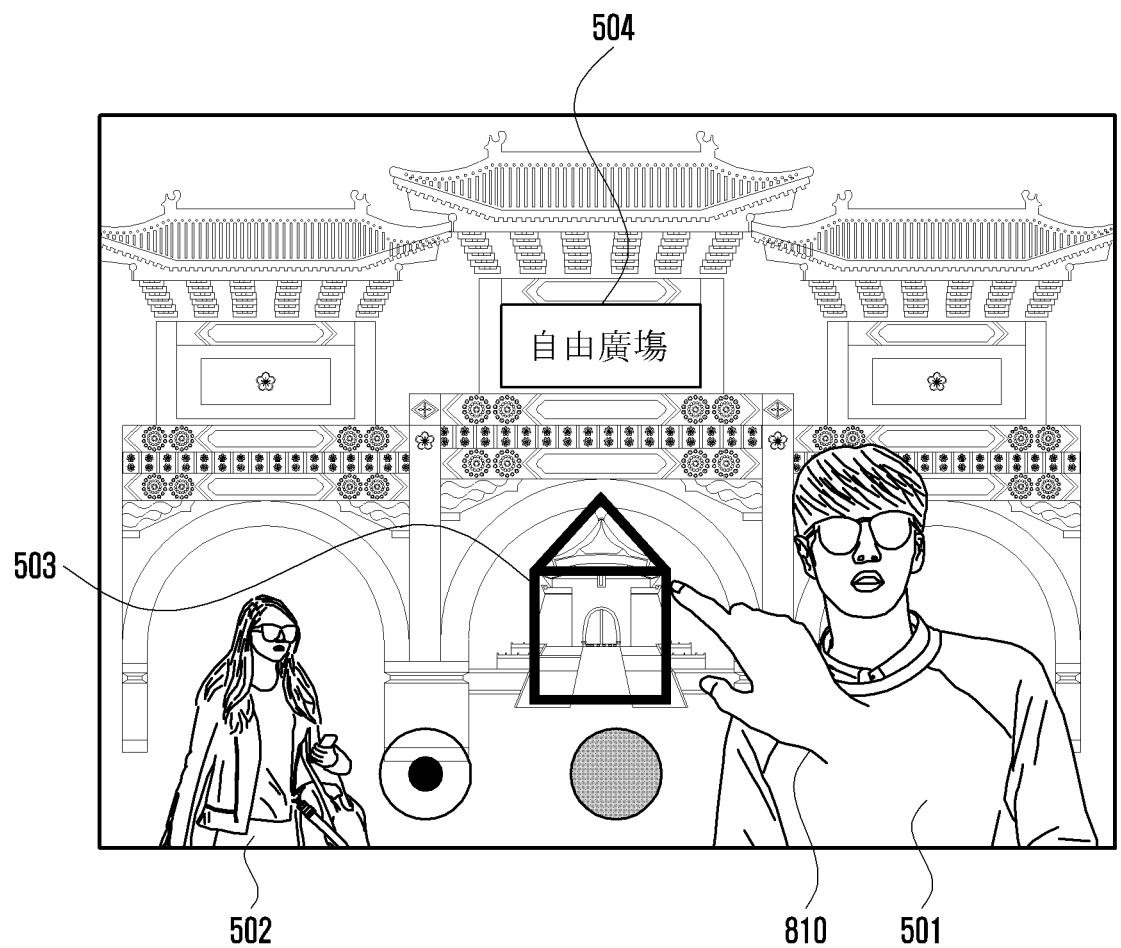
FIG. 8A illustrates a method for performing a function of the electronic device 301 according to certain embodiments.
Figure 8B:
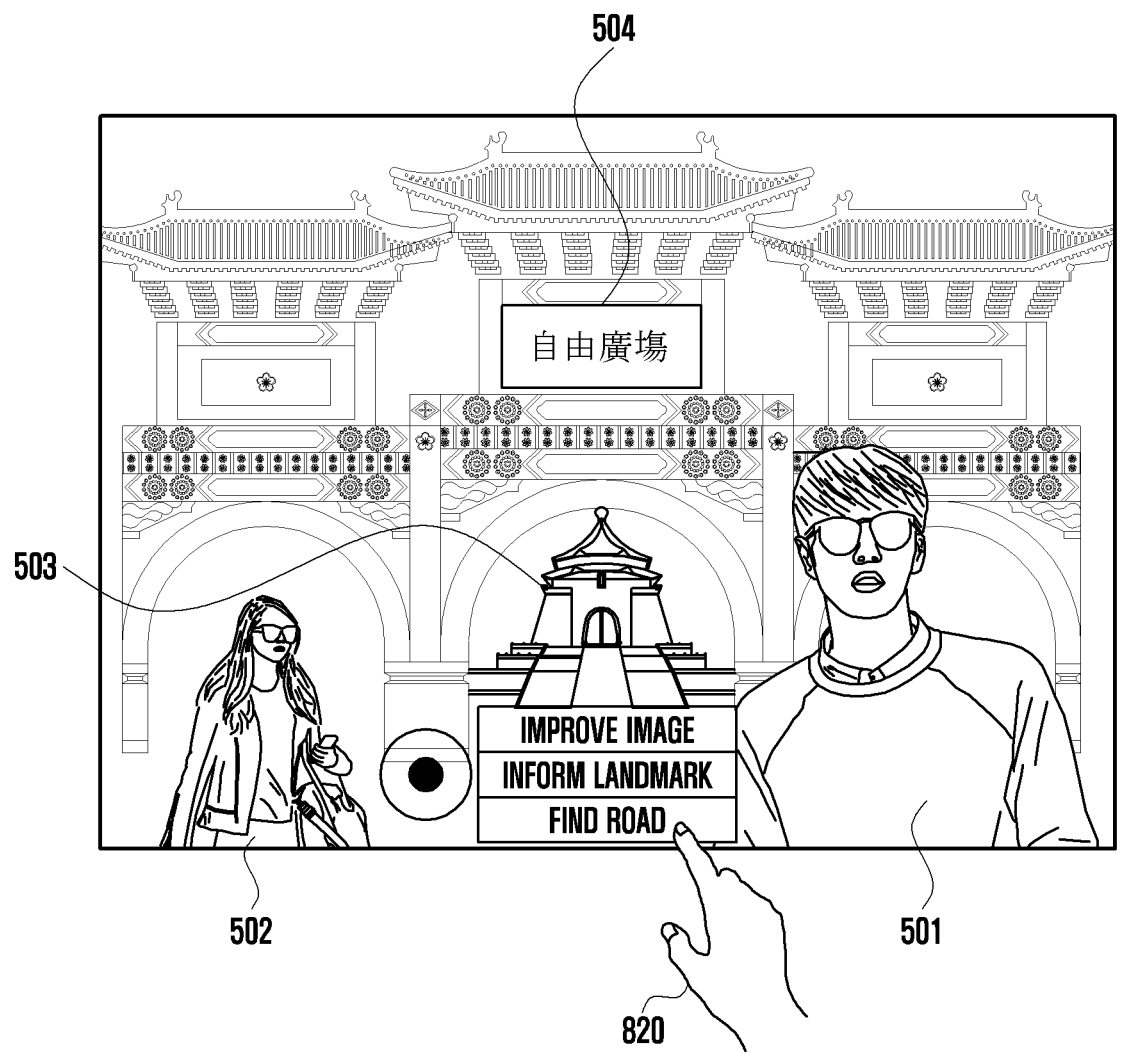
FIG. 8B illustrates a method for performing a function of the electronic device 301 according to certain embodiments.
Figure 8C:
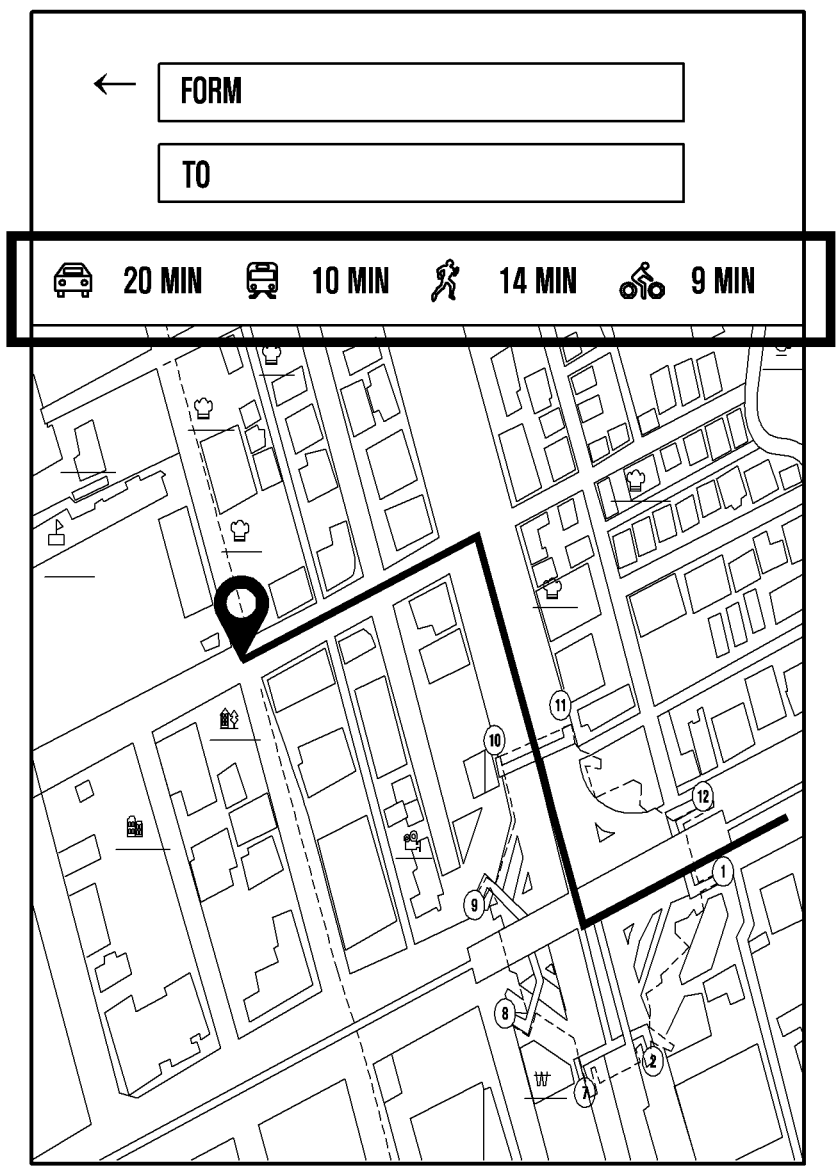
FIG. 8C illustrates a method for performing a function of the electronic device 301 according to certain embodiments.

FIG. 8A illustrates a method for performing a function of the electronic device 301 according to certain embodiments, FIG. 8B illustrates a method for performing a function of the electronic device 301 according to certain embodiments, and FIG. 8C illustrates a method for performing a function of the electronic device 301 according to certain embodiments.

According to certain embodiments, the electronic device 301 may display a first image (e.g., the first image in FIG. 5) through a display. For example, the first image may include areas 501, 502, 503, and 504 corresponding to one or more objects.

Referring to FIG. 8A, the electronic device 301 according to certain embodiments may receive a user input (e.g., a touch gesture input) for designating a partial area of the first image through a touch panel.

For example, the user input may be input onto the area 503 corresponding to a building object included in a first image. For example, a user may input, on an area on which the partial area 503 is displayed, a touch gesture 810 in the form of a pentagonal closed loop, in order to designate the partial area 503 corresponding to a specific building object included in the first image. For example, a user may input the touch gesture 810 subsequent to a gesture in the form of the closed loop shaped like a house. For example, the subsequent touch gesture input 810 in the form of a house may be an input requesting performance of a designated function processing, based on the partial area 503 to which the touch gesture 810 has been input.

For example, the designated function corresponding to the input of the subsequent touch gesture 810 in the form of a house may request an image improvement effect on the partial area 503 designated by the touch gesture 810 or an effect providing information (e.g., landmark information, location information) on an object corresponding to the designated partial area 503.

Referring to FIG. 8B, the electronic device 301 according to certain embodiments may display a menu bar corresponding to the input touch gesture 810, based on an input of the subsequent touch gesture 810 in the form of a house. For example, the electronic device 301 may display, on a partial area of a screen on which a first image is displayed, a menu bar including at least one item of an image improvement function, an out of focus function, a function providing landmark information, or a route finding function, in response to the input of the subsequent touch gesture 810 in the form of a house.

For example, after the touch gesture 810 is received in FIG. 8A, the electronic device 301 may output a menu bar corresponding to the touch gesture 810 and receive, through a touch panel, a user touch input 820 selecting one of items displayed on the menu bar. For example, the electronic device 301 may receive the user touch input 820 requesting a route finding function associated with a building corresponding to the designated partial area 503 of a first image.

For example, the menu bar output operation and the user touch input 820 reception operation in FIG. 8B may be omitted based on a type of a function corresponding to the input touch gesture 810 or a user's setting.

FIG. 8C illustrates a screen on which a corresponding function (route finding function) is performed according to the touch gesture input 810 in FIG. 8A and the user touch input 820 in FIG. 8B.

For example, the electronic device 301 may provide a location of a building object corresponding to the partial area 503 designated by the touch gesture 810 in FIG. 8A. For example, the electronic device 301 may perform a pre-configured application, based on a user input (for example, the house shaped touch gesture 810 in FIG. 8A and the user touch input 820 in FIG. 8B), and control to output location information of the building object through the performed application. For example, the electronic device 301 may output information including a designated route from a current location of the electronic device 301 to a location of a building object corresponding to the partial area 503. Alternatively, the electronic device 301 may output information on a route from the location of the building object to a specific location input by the user.

According to certain embodiments, the electronic device 301 may simply and conveniently acquire desired information or perform image correction on an image displayed through a display, by a pre-configured touch gesture input operation.

According to certain embodiments, the electronic device 301 may easily and quickly perform one of a plurality of functions that can be performed on a display screen of a first image, through a user gesture input.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a camera module;
   a display including a touch panel; and
   a processor,
   memory including instructions, wherein the instructions are executable by the processor to cause the electronic device to:
   acquire a first image using the camera module,
   display the acquired first image through the display,
   obtain a user input to the touch panel including a gesture designating a partial area of the displayed first image,
   detect a type of an object included within the partial area designated by the user input,
   determine a function based on the detected type of the object and the gesture,
   generate a second image by using the first image by processing image information included in the designated partial area using the determined function, and
   display the generated second image through the display.

2. The electronic device of claim 1, wherein a guide gesture shape is progressively displayed on the display as the gesture draws the guide gesture shape by touch inputs to the touch panel.

3. The electronic device of claim 1, wherein the instructions are further executable by the processor to cause the electronic device to: after obtain the user input and the gesture, display on the display a menu listing a plurality of selectable functions, and
   wherein the function associated with the gesture is selected from the menu by a second user input received to the menu.

4. The electronic device of claim 1, further comprising a communication module, wherein determining the type of the object further includes: transmit image information related to the first image to an external electronic device using the communication module, and
   receiving information from the external electronic device at least partially indicating the type of the object.

5. The electronic device of claim 1, further comprising a communication module,
   wherein the instructions are further executable by the processor to cause the electronic device to:
   transmit image information related to the first image to an external electronic device using the communication module, the external electronic device configured to perform a function on the image information included in the designated partial area, and
   receive first image correction information from the external electronic device through the communication module, the first image correction information generated by the external electronic device performing the function on the image information,
   wherein the second image is generated using at least the first image correction information.

6. The electronic device of claim 1, wherein the function is an image correction function including at least one of white balance adjustment, color adjustment, noise reduction, sharpening, detail enhancement, and size adjustment.

7. The electronic device of claim 1, wherein the image information included in the designated partial area includes text information, and
   wherein the function by which the image information is processed includes translating the text information from a first language into a second language.

8. The electronic device of claim 1, wherein the function includes:
   identifying location information related to an object disposed in the partial area of the displayed first image, and
   executing an application to output the identified location information.

9. The electronic device of claim 1, wherein the generated second image is stored in the memory.

10. The electronic device of claim 1, wherein the first image comprises a preview image.

11. A method of an electronic device, comprising:
    displaying a first image through a touch screen display;
    obtaining a user input to the touch screen display including a gesture designating a partial area of the displayed first image;
    detecting a type of an object included within the partial area designated by the user input;
    determining a function based on the detected type of the object and the gesture;
    generating, by a processor, a second image by using the first image by processing image information included in the designated partial area using the determined function; and
    displaying the generated second image through the touch screen display.

12. The method of claim 11, further comprising:
    after obtaining the user input and the gesture, displaying on the touch screen display a menu listing a plurality of selectable functions, and
    wherein the function associated with the gesture is selected from the menu by a second user input received to the menu.

13. The method of claim 11, further comprising:
    transmitting image information related to the first image to an external electronic device using a communication module, the external electronic device configured to perform a function on the image information included in the designated partial area, and
    receiving first image correction information from the external electronic device through the communication module, the first image correction information generated by the external electronic device performing the function on the image information, wherein the second image is generated using at least the first image correction information.

14. The method of claim 11, wherein the function is an image correction function including at least one of white balance adjustment, color adjustment, noise reduction, sharpening, detail enhancement, and size adjustment.

15. The method of claim 11, wherein the image information included in the designated partial area includes text information, and wherein the function by which the image information is processed includes translating the text information from a first language into a second language.

16. The method of claim 11, wherein the function includes:

identifying location information related to an object disposed in the partial area of the displayed first image, and executing an application to output the identified location information.

17. The method of claim 11, wherein the generated second image is stored in a memory.

18. The method of claim 11, wherein the first image comprises a preview image.

\* \* \* \* \*